United States Patent [19]

Moser

[11] Patent Number: 5,860,626
[45] Date of Patent: Jan. 19, 1999

[54] SURFACE OF A BODY EXPOSED TO CIRCUMFLUENT FLUID

[76] Inventor: Josef Moser, Erlenstrasse 2, Erding, Germany, D-85435

[21] Appl. No.: 633,777

[22] PCT Filed: Oct. 18, 1994

[86] PCT No.: PCT/EP94/03422

§ 371 Date: Jun. 24, 1996

§ 102(e) Date: Jun. 24, 1996

[87] PCT Pub. No.: WO95/11388

PCT Pub. Date: Apr. 27, 1995

[30] Foreign Application Priority Data

Oct. 20, 1993 [DE] Germany ............. 9316009 U

[51] Int. Cl.$^6$ ............. B64C 1/38; B64C 21/00; B64C 21/10
[52] U.S. Cl. ............. 244/200; 244/204; 244/130
[58] Field of Search ............. 244/199, 200, 244/201, 204, 130

[56] References Cited

U.S. PATENT DOCUMENTS

| | | |
|---|---|---|
| 1,531,967 | 3/1925 | Macmillan . |
| 1,773,280 | 8/1930 | Scott . |
| 2,272,358 | 2/1942 | Steinhaus ............. 244/200 |
| 2,740,596 | 4/1956 | Lee ............. 244/40 |
| 4,650,138 | 3/1987 | Grose ............. 144/130 |
| 4,930,729 | 6/1990 | Savill ............. 244/200 |
| 4,932,612 | 6/1990 | Blackwelder et al. ............. 244/200 |
| 4,986,496 | 1/1991 | Marentic et al. ............. 244/130 |
| 5,069,403 | 12/1991 | Marentic et al. ............. 244/130 |
| 5,542,630 | 8/1996 | Savill ............. 244/200 |

FOREIGN PATENT DOCUMENTS

| | | |
|---|---|---|
| 30817 | 11/1907 | Australia . |
| 0212167 | 3/1987 | European Pat. Off. . |
| 0246915 | 11/1987 | European Pat. Off. . |
| 18245 | 5/1882 | Germany . |
| 1934246 | 1/1970 | Germany . |
| 68032886 | 12/1980 | Germany . |
| 3210498 | 10/1983 | Germany . |
| 3534293 | 4/1987 | Germany . |
| 3609541 | 9/1987 | Germany . |
| 9013099 | 12/1991 | Germany . |
| 4206066 | 9/1993 | Germany . |
| 1677346 | 9/1991 | U.S.S.R. . |
| 1522213 | 8/1978 | United Kingdom . |
| 2068502 | 8/1981 | United Kingdom . |
| 2079399 | 1/1982 | United Kingdom . |
| WO84/03867 | 10/1984 | WIPO . |

OTHER PUBLICATIONS

Walsh, M.J.; et al.: AIAA Paper 84–0347, Jan. 1984, S.1–10.

*Primary Examiner*—V. Lissi Mojica
*Attorney, Agent, or Firm*—Jacobson, Price, Holman & Stern, PLLC

[57] ABSTRACT

The invention relates to a surface of a body exposed to circumfluent fluid with elevations protruding from the base surface.

In order to design the surface of a body exposed to circumfluent fluid with elevations protruding from the base service with an even more favorable flow, it is provided that when the surface is viewed from the top the elevations are bordered in each case by two boundary lines of which the one boundary line is longer and possesses a greater curvature than the other boundary line so that the cross-section area of an airfoil is produced.

19 Claims, 3 Drawing Sheets

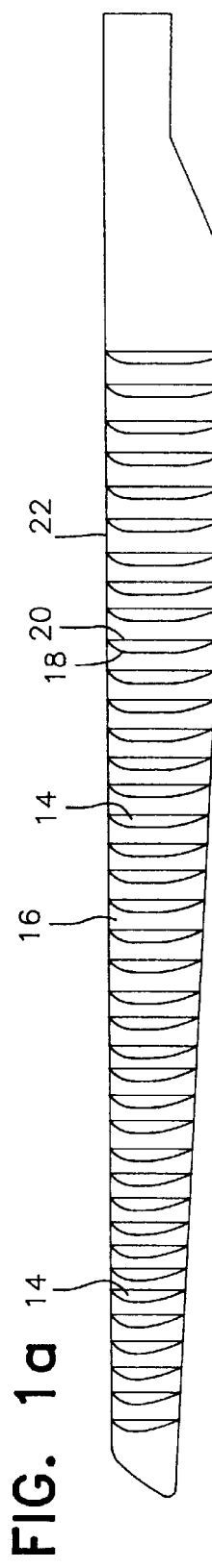
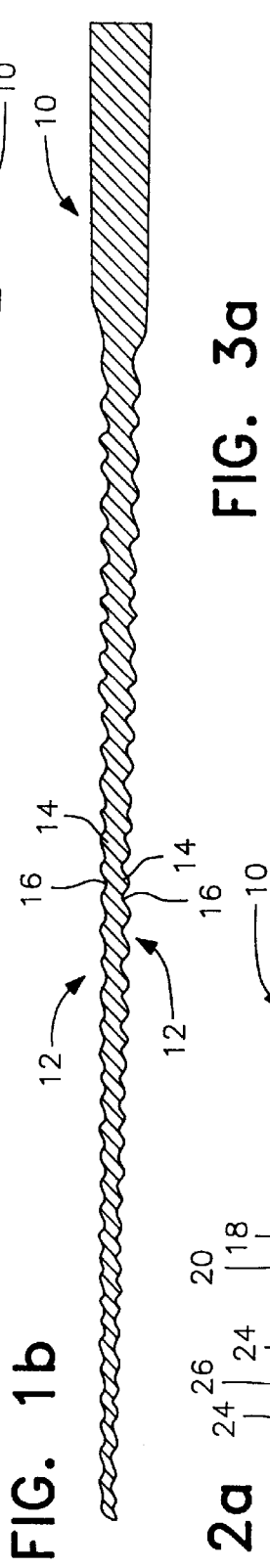
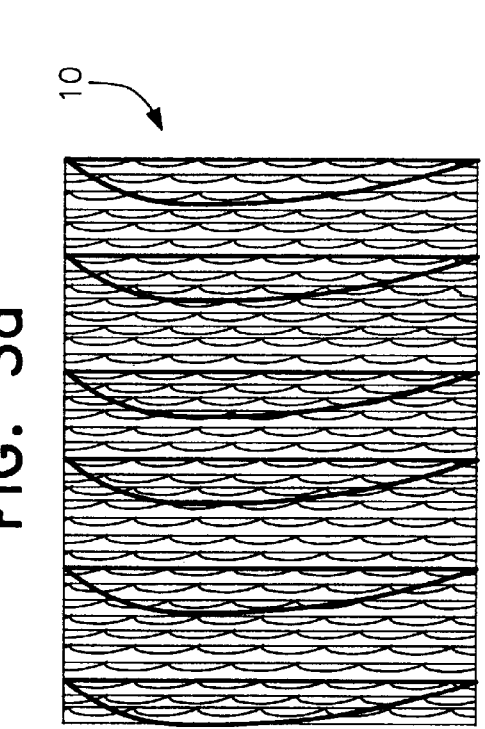
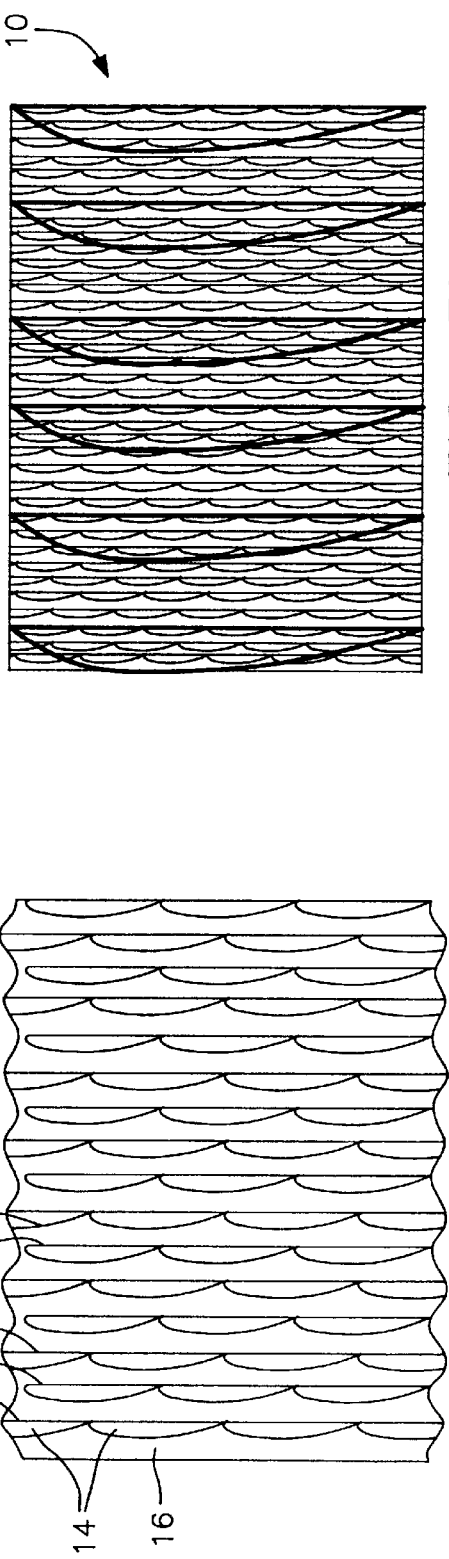
FIG. 1a
FIG. 1b
FIG. 2a
FIG. 2b
FIG. 3a
FIG. 3b

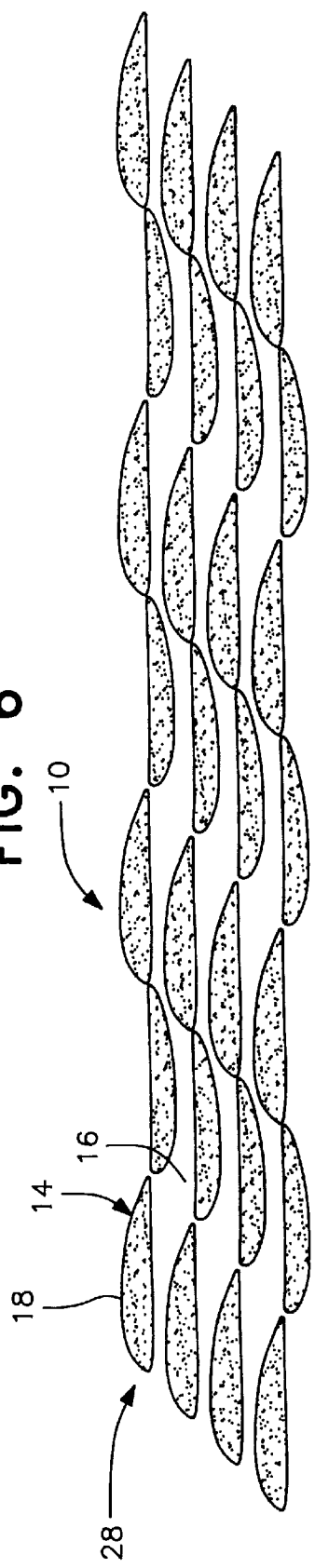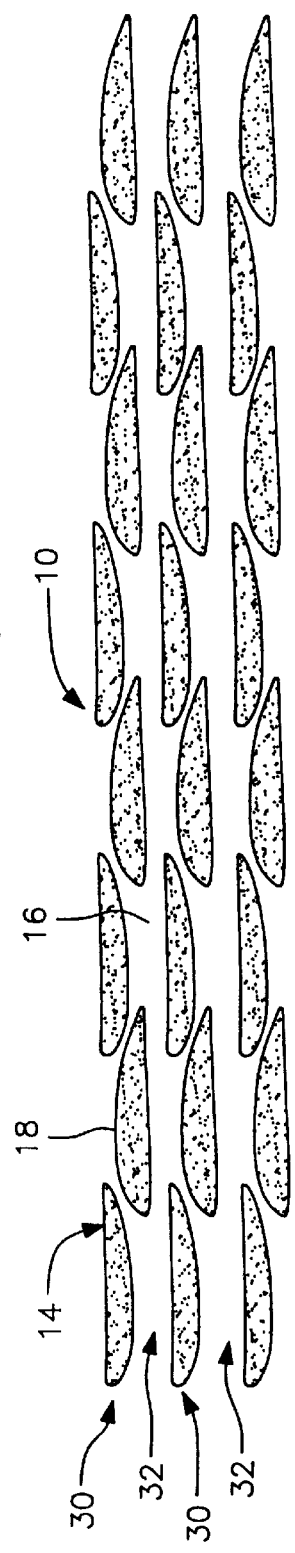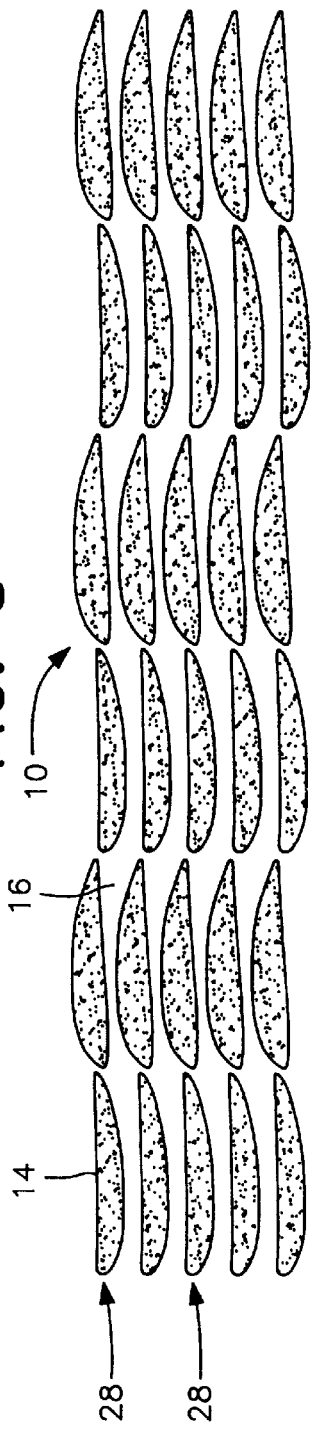

SURFACE OF A BODY EXPOSED TO CIRCUMFLUENT FLUID

BACKGROUND OF THE INVENTION

1. Field of the Invention

The invention relates to a surface of a body exposed to circumfluent fluid with elevations protruding from the base surface.

2. Description of the Related Art

It is already known that bodies exposed to circumfluent flows such as the external skin of airplanes are provided with fine waves, that is with corresponding relativly small elevations protruding from the base surface. In this way, a surface with an overall more favorable flow is obtained.

On the other hand, it is known, for example from the German utility model DE 90 13 099 U, that rotors can be provided in wave form to absorb energy from a flowing medium or to release energy to a flowing medium. The corresponding undulation of the rotor can substantially improve its efficiency.

SUMMARY OF THE INVENTION

The object of the present invention is to provide a surface of a body exposed to circumfluent fluid with small elevations protruding from the base surface for an improved favorable flow.

This object is achieved in accordance with the present invention in that where a surface with elevations protruding from the base surface, in a view looking down on the surface the elevations are bordered in each case by two boundary lines of which one boundary line is longer and possesses a greater curvature than the other boundary line so that the cross-sectional area of an aerofoil is produced. The flow skimming over the surface therefore covers a longer path on the one side of the elevation than on the other side.

The elevations can now be arranged with respect to each other in such a way that in each case a boundary line with a larger curvature of an elevation is positioned next to a boundary line with a smaller curvature of a following elevation. In this way a channel is created which, on the one hand, is bordered by the comparatively longer and more curved boundary surface of an elevation and, on the other hand, by the shorter boundary surface with a smaller curvature of an adjacent elevation. In this way, an interference effect is obtained within the boundary layer of the fluid flowing round the body. The interference effect can be influenced dependency on the orientation of the curvature of the respective elevations to one another. The amount of curvature, and in particular the differences in curvature, between the respective boundary lines, also influences this effect.

In accordance with one embodiment of the present invention, several elevations can be arranged in rows with one behind the other, and several rows of elevations can be positioned next to each other.

In the rows formed by the elevations, the respective boundary lines of the elevations with a larger curvature can be aligned in one direction.

The boundary lines of the elevations with the larger curvature can point alternately in opposite directions in a row. The height of the elevations in the event of rows of elevations being positioned next to each other may vary. Furthermore, the height of the elevations positioned one behind the other in a row may vary.

The elevations may also be curved in the direction of their end pointing away from the base surface.

The surface of the elevations lying opposite the base surface can be parallel to the base surface or be aligned diagonally to the base surface while the lateral boundary surfaces of the elevations are aligned perpendicularly to the base surface in each case.

Furthermore, the surface may possess first, comparatively high elevations which form a macrostructure, and on this macrostructure in turn comparatively low elevations can be created which form a microstructure.

These surfaces can be applied to the body exposed to circumfluent fluid subsequently as an external skin. In principle, however, it is possible that the body exposed to circumfluent fluid can be formed with the surface in accordance with the present invention right from the start.

In principle, the surface in accordance with the present invention can be used preferentially with all bodies exposed to circumfluent flows. Thus, utilization can be particularly advantageous for rotors with the efficiency being correspondingly improved with. These rotors can, on the one hand, serve to extract energy from a flowing medium such as with wind rotors, water turbines, steam turbines or rotors in gas meters or water meters. Rotors for imparting energy to a flowing medium such as airplane propellers, marine propellers, airplane engine rotors, helicopter rotors, fans, fan rotors, vacuum cleaner rotors, automobile fan rotors or rotors in air/conditioners may also possess the surface in accordance with the present invention.

While improvements in the efficiency of the rotors can be achieved in each case, it is possible to reduce the noise development generated by the flow when lining the surface of ducts or hoses where a flow is present. Such ducts can be for example, water channels, air ducts, hoses, turbine ducts or similar conduits.

If a external skin of vehicles is fitted with present surface in accordance with the invention, the drag coefficient of the vehicles exposed to circumfluent flow is reduced. In this case, therefore, the external skins of ships, airplanes, gliders, submarines, cars, buses and trucks, of high-speed trains such as the TGV, airships, balloons, boats and dinghies, surfboards, bicycles and rockets can be provided with the surface in accordance with the present invention.

Stationary bodies exposed to circumfluent flow such as towers, chimneys, on the fronts of high-rise buildings can also be provided with the surface in accordance with the present invention. In these cases, the noise development created by the circumfluent flow is reduced.

The flight characteristics of torpedoes and projectiles can also be enhanced by the surface in accordance with the present invention. The corresponding flow properties of sails for sailing ships, parachutes, para-gliders and hang-gliders can also be enhanced by the surface in accordance with the present invention. The surface in accordance with the present invention can be used in the surface design of oars and paddles. The circumfluent surface of tents and tarpaulins can also be enhanced by a surface in accordance with the present invention. Similarly designed skis, and in particular skis for ski-jumping, can also be enhanced with regard to their gliding and/or circumfluent flow characteristics. Finally, the surface in accordance with the present invention can also be used advantageously as tire tread for airplane tires or automobile tires.

BRIEF DESCRIPTION OF THE DRAWINGS

Preferred embodiments of the surface in accordance with the present invention are shown in the following drawings, where;

FIGS. 1a, 1b: show a top view and a longitudinal cross-section, respectively through a rotor blade possessing an embodiment of the surface in accordance with the present invention, FIGS. 2a, 2b: show a top view and a cross-section, respectively, of a second embodiment of the present invention, FIGS. 3a, 3b: show a top view and a cross-section, respectively, of a surface in accordance with a third embodiment, FIGS. 6–8: show top views of further embodiments of a surface in accordance with the present invention.

DESCRIPTION OF THE PREFERRED EMBODIMENTS

Figure 4A:
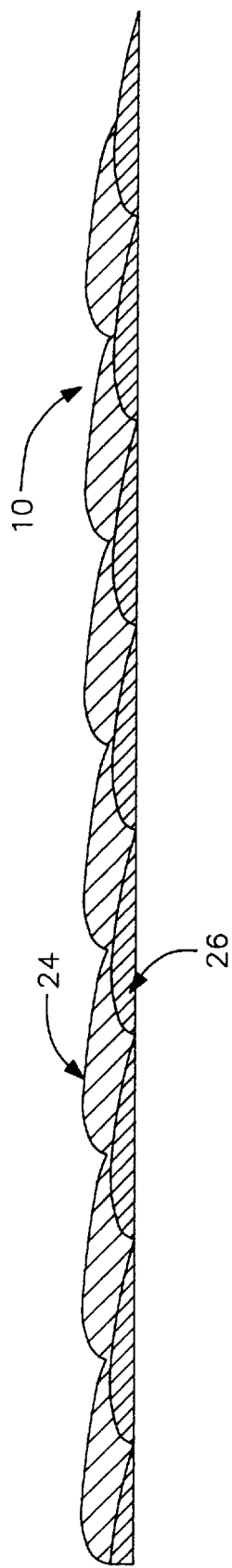
FIGS. 4a, 4b: show a longitudinal cross-section and a transverse cross-section of a surface in accordance with the present invention according to a fourth embodiment.

In the embodiment in accordance with FIGS. 1a and 1b a rotor blade 10 designed in a known manner is shown. On both sides the rotor blade 10 possesses a surface 12 possessing elevations 14 protruding from the base surface 16. The elevations 14 are bordered, when the surface is viewed from the top, in each case by two boundary lines 18 and 20. Boundary line 20 is straight while boundary line 18 possesses a curvature arching towards the outside. All in all, the boundary lines 18 and 20 border the elevation 14 in such a way that the cross-sectional area of an airfoil is produced as can be seen clearly in FIG. 1a. This shape is characteristic for the elevations 14. In the embodiment in accordance with FIG. 1a the straight boundary lines 20 are aligned perpendicularly to the front boundary border 22 of the rotor blade 10. The perpendicular line 20 can, however, also be alternatively positioned at an angle to the rotor blade.

The boundary lines of larger curvature 18 are in each case aligned towards the free end of the rotor blade as is also shown in FIG. 1a. The surface as shown in FIGS. 1a and 1b cannot only be formed on a flat rotor blade as shown here, but also on a waved rotor blade in accordance with German utility model DE 90 13 099 U. The surface in accordance with the present invention described here by way of example by use on a rotor blade can also be applied to any other body exposed to circumfluent flow.

FIGS. 2a and 2b show a further embodiment of the surface in accordance with the invention. Here, the elevations 14 are applied in rows 24 or 26 behind one another. Several rows 24 and 26 are parallel to each other on the surface. The rows 24 and 26 positioned next to each other are arranged in such a way that in each case a boundary line 18 with larger curvature is opposed by a straight boundary line 20 of the elevation in the following next row. In accordance with this example, the rows 24 and 26 of the elevations are staggered with respect to one another so that the elevations 14 of two adjacent rows do not oppose each other exactly but rather in a staggered fashion. It can be seen from FIG. 2b that the elevations of the rows 24 and 26 show different heights. The elevations 14 are also curved in the direction of their end pointing away from the base surface as can be seen, for example, from FIG. 2b.

Figure 4B:
Figure 5:
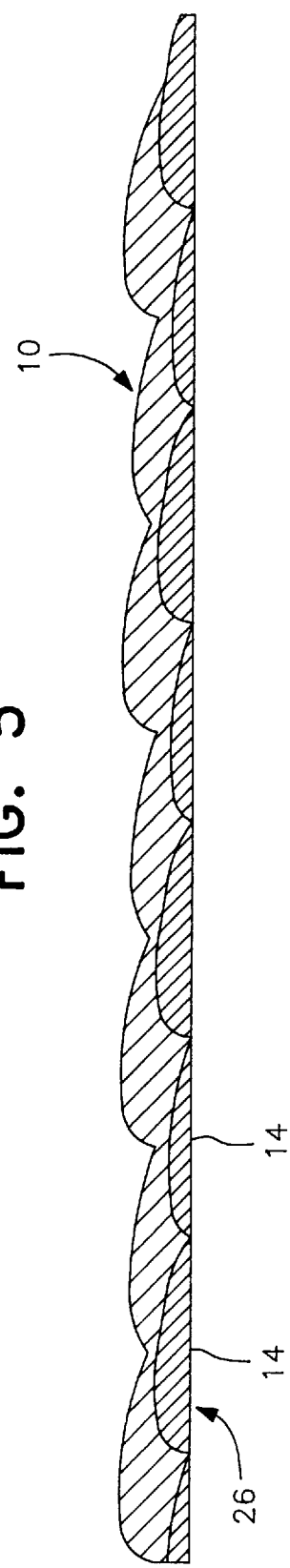
FIG. 5: show a longitudinal cross-section through a surface in accordance with a fifth embodiment.

This difference in height between rows 24 and 26 is shown even more clearly in the embodiment in accordance with the sectional representations 4a and 4b. The embodiment in accordance with the sectional presentation in accordance with FIG. 5 differs from the embodiment in accordance with FIGS. 4a and 4b in that elevations 14 of row 26 positioned one behind the other are of different height.

In accordance with FIGS. 3a and 3b it is indicated that the surface 10 possesses first, comparatively high elevations 14' which form a macrostructure. On this macrostructure are created in turn comparatively low elevations 14" which form a microstructure superimposed on the macrostructure.

In FIG. 6 an embodiment of the surface 10 is shown where the elevations 14 are arranged one behind the other in row 28 in such a way that their boundary line with larger curvature 18 is aligned in each case alternately in an opposite direction in each case. Several rows 28 are arranged in staggered fashion next to each other as shown in FIG. 6.

In FIG. 7 rows 30 and 32 in each case are positioned in alternating and staggering fashion and in each case are formed from the elevations 14. The individual rows 30 and 32 comprise elevations 14 not arranged directly behind one another, but rather leaving a space between each other. Adjacent these spaces of row 30 are then positioned the elevations 14 of the next following row 32 with the boundary line of larger curvature 18 being aligned in each case in the direction of the spaces between the elevations 14 of the row 30.

The surface 10 shown in the embodiment in accordance with FIG. 8 corresponds to the surface in accordance with the embodiment shown in FIG. 6. However, in this embodiment the rows 28 positioned next to each other are not staggered with respect to each other.

I claim:

1. A surface of a body exposed to circumfluent fluid flow having a boundary layer which comprises a base surface and a plurality of elevations protruding from said base surface to improve the fluid flow in said boundary layer, each of said elevations, when viewed from above, forming first and second boundary lines for guiding fluid flow in said boundary layer along said base surface, said first boundary line being longer and having a greater curvature than said second boundary line to produce a cross-sectional shape of said elevation in the form of an airfoil.

2. A surface of a body exposed to circumfluent fluid flow in accordance with claim 1, wherein said elevations are positioned next to each other in such a way that in each case said first boundary line with the larger curvature of one said elevation is adjacent said second boundary line with a smaller curvature of said next elevation.

3. A surface of a body exposed to circumfluent fluid flow in accordance with claim 1, wherein said elevations are aligned in rows with one said elevation next to another said elevation in each row and said rows of elevations positioned next to each other.

4. A surface of a body exposed to circumfluent fluid flow in accordance with claim 3, wherein all said elevations in said rows have said first boundary line with the larger curvature aligned in one generally common direction.

5. A surface of a body exposed to circumfluent fluid flow in accordance with claim 3 wherein said elevations in said rows have said first boundary lines with the larger curvature aligned alternately in generally opposite directions.

6. A surface of a body exposed to circumfluent fluid flow in accordance with claim 3, wherein a height of said elevations in one row is different from a height of said elevations in a next said row.

7. A surface of a body exposed to circumfluent fluid flow in accordance with claim 3, wherein each said elevation in one row has a height that is different from a next said elevation in said row.

8. A surface of a body exposed to circumfluent fluid flow in accordance with claim 1, wherein said elevations are also curved toward their top height that is pointing away from said base surface.

9. A surface of a body exposed to circumfluent fluid flow in accordance with claim 1, wherein a surface of said elevations lying opposite said base surface is positioned diagonally to said base surface while lateral boundary areas of said elevations in each case are aligned generally perpendicularly to said base surface.

10. A surface of a body exposed to circumfluent fluid flow in accordance with claim 1, wherein said surface has first high elevations forming a macrostructure and said elevations in said macrostructure in turn including comparatively low elevations on their surface forming a microstructure on said elevations of said macrostructure.

11. Elevations for a base surface of a body subjected to a directed fluid flow, said elevations having an airfoil form in a cross-sectional plane substantially parallel to said base surface, said airfoil form being generally aligned with said direct fluid flow and including two side boundaries, a first of said boundaries being longer and having a greater curvature than a second of said boundaries, and said base surface including a plurality of said elevations to improve drag efficiency of said surface.

12. The elevations as described in claim 11, wherein a height of said elevations on said surface varies.

13. The elevations as described in claim 11, wherein said elevations include a convex and curved surface above said base surface.

14. The elevations as described in claim 11, wherein a plurality of said elevations have said boundaries substantially parallel with said directed fluid flow.

15. The elevations as described in claim 11, wherein said elevations form a row on said surface by aligning one said elevation behind another said elevation and aligning a plurality of said rows substantially adjacent and parallel to each other.

16. The elevations as described in claim 15, wherein said elevations in said row are oriented in the same direction and said row that is adjacent and parallel has said elevations oriented in an opposite direction.

17. The elevations as described in claim 15, wherein said elevations in said row are oriented in an opposite direction from a next said elevation in said row.

18. The elevations as described in claim 15, wherein said elevations in said row have a height that is different from a height of said elevations in an adjacent row.

19. The elevations as described in claim 11, wherein tall elevations are attached on said base surface and shorter elevations are located on a surface of said tall elevations.

* * * * *